United States Patent [19]

Bateman

[11] Patent Number: 4,507,742

[45] Date of Patent: Mar. 26, 1985

[54] AIRCRAFT WEIGHT AND BALANCE SYSTEM WITH AUTOMATIC LOADING ERROR CORRECTION

[75] Inventor: Charles D. Bateman, Bellevue, Wash.

[73] Assignee: Sundstrand Data Control, Inc., Redmond, Wash.

[21] Appl. No.: 403,438

[22] Filed: Jul. 30, 1982

[51] Int. Cl.³ .......................................... G01M 1/12
[52] U.S. Cl. ................................. 364/567; 364/571; 177/136
[58] Field of Search .................. 364/463, 567, 571; 73/65; 177/25, 136

[56] References Cited

U.S. PATENT DOCUMENTS

| | | | |
|---|---|---|---|
| 3,701,279 | 10/1972 | Harris et al. | 177/136 X |
| 3,746,844 | 7/1973 | Azum et al. | 364/463 |
| 4,094,367 | 6/1978 | Jones et al. | 364/567 X |
| 4,110,605 | 8/1978 | Miller | 364/463 |
| 4,192,005 | 3/1980 | Kurtz | 364/558 X |
| 4,225,926 | 9/1980 | Wendt | 364/463 |
| 4,312,042 | 1/1982 | Bateman | 364/567 X |
| 4,313,510 | 2/1982 | Tomlinson | 364/567 X |
| 4,330,837 | 5/1982 | Itani | 364/567 |
| 4,347,574 | 8/1982 | Parsons | 364/463 |
| 4,399,515 | 8/1983 | Gross | 364/558 X |

*Primary Examiner*—Edward J. Wise
*Attorney, Agent, or Firm*—Wood, Dalton, Phillips, Mason, & Rowe

[57] ABSTRACT

A weight and balance system which automatically compensates for loading errors while the aircraft is stationary. A weight signal is generated from the outputs of a pair of inclinometers mounted on adjacent opposite ends of a landing gear member which bends in response to aircraft weight. The weight signal generated just after no movement of the aircraft is detected is held in a latch. The held weight signal and a subsequently generated weight signal are combined to provide a signal representative of the difference therebetween. The difference signal is scaled by an error correction coefficient to provide a loading error compensation signal which is combined with the subsequently generated weight signal to provide a corrected weight signal. The system further includes means for performing reasonableness tests in response to the restoration of power to the system after power has been down. The reasonableness tests include determining whether the aircraft had been moved or whether there had been a load change during the power down. If movement of the aircraft is determined to have occurred, the latch is reset to hold the weight signal generated just after power to the system is restored. If a load change is determined to have occurred, a power down load correction signal is generated and combined with the loading error compensation signal and the subsequently generated weight signal to provide the corrected weight signal.

30 Claims, 9 Drawing Figures

AIRCRAFT WEIGHT AND BALANCE SYSTEM WITH AUTOMATIC LOADING ERROR CORRECTION

BACKGROUND OF THE INVENTION

The present invention relates to an aircraft weight and balance system and more particularly to a weight and balance system which automatically compensates for loading errors while the aircraft is stationary.

Before each flight, the weight and balance of an aircraft must be determined to insure that they are within safe operating limits. This is typically accomplished by estimating the total aircraft weight when loaded and the distribution of that weight in order to determine the aircraft's center of gravity or balance.

To insure proper distribution of the weight, onboard weight and balance systems for aircrafts have been developed which calculate the weight and center of gravity of the aircraft in response to various sensor signals. Known weight and balance systems using strain gauges and pressure or magnetic variable reluctance sensors have been found to be unreliable due to problems in the sensor's stability, accuracy, and ability to survive harsh environments.

A known weight and balance system which overcomes the above problems is shown in Bateman, U.S. Pat. No. 4,312,042. This system uses inclinometers positioned to measure the angle of bending in a structural member, such as the landing gear of the aircraft, where the angle of bending is proportional to the weight or force on the member. The inclinometers provide output signals which are summed to cancel out attitude and acceleration changes, whereby only that portion of the angle of bending corresponding to weight is obtained. When the aircraft is stationary and being loaded and unloaded, it has been found that moments are created which constrain the bending of the structural member on which the inclinometers are mounted so that an error results in the calculated weight derived from the inclinometer outputs. Although the moments constraining the bending of the landing gear members are virtually eliminated once the aircraft is moved so that the members deflect to their true unconstrained value resulting in an accurate weight determination, it is impractical to require that the aircraft be moved after loading in order to determine whether its weight and balance are within the safety limits.

SUMMARY OF THE INVENTION

In accordance with the present invention, the disadvantages of prior weight and balance systems for aircraft have been overcome.

The weight and balance system of the present invention accurately calculates weight while the aircraft is stationary, the system including means for automatically correcting loading errors in weight signals representing the sensed aircraft weight on a landing gear, weight signals being generated from the outputs of sensors which may be inclinometers, strain gage sensors, magnetic reluctance transducers or the like.

The system for automatically correcting loading errors holds the weight signal, generated just after the aircraft stops moving in a latch. While the aircraft is stationary, the held weight signal is combined with a weight signal generated subsequently thereto to provide a signal representative of the difference therebetween. The difference signal is multiplied by an error correction coefficient associated with the particular landing gear the weight on which is being determined, to provide an error compensation signal. The error compensation signal is then combined with the subsequently generated weight signal to provide a corrected weight signal.

The system further includes means for making reasonableness tests on individual landing gears in response to the restoration of power after power to the system has been down to determine whether the landing gear had moved or whether there had been a load change during the power down. In the event that a landing gear member is determined to have moved during the power down, the latch is reset to hold the uncorrected weight signal generated immediately after power has been restored to the system. In the event that the load on a landing gear member is determined to have changed during the power down, a power down correction factor is generated and combined with the uncorrected weight signal and the error compensation signal to provide the corrected weight signal, the power down correction factor compensating for the larger loading error which would otherwise result.

The system for correcting loading errors further includes means for detecting movement of the aircraft in response to the difference in the outputs from a pair of inclinometers mounted on adjacent opposite ends of the landing gear member, the difference signal being proportional to acceleration independent of the weight on the member. The acceleration signal is applied to a third order band pass filter which acts as a pseudo double integrator, the output of which represents movement of the landing gear in distance. The output of the filter is applied to a comparator which determines whether the landing gear is moving or stationary.

Further advantages of the invention will be readily apparent from the following specification and from the drawings in which:

Figure 1:
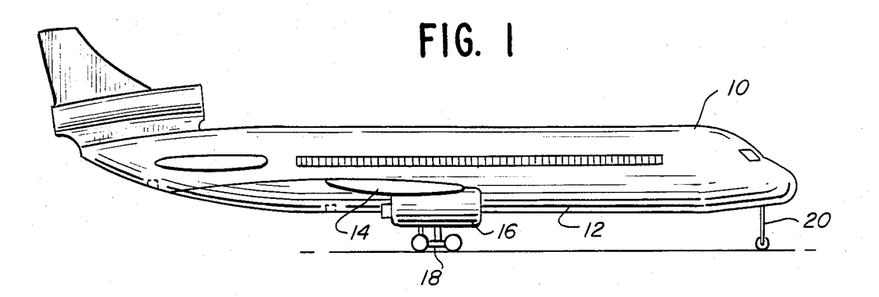
FIG. 1 is a side elevational view of a typical aircraft with which the present invention is associated.

The weight and balance system of the present invention is used to determine the weight and center of gravity of an aircraft such as illustrated in FIG. 1, while the aircraft is stationary on a runway or loading ramp. The aircraft 10 has a fuselage 12, with a pair of wings, the right wing being shown at 14, and mounting a jet engine 12. In the illustrated embodiment, the aircraft 10 has main landing gear, one of which is shown at 18, and a nose gear 20.

Figure 2:
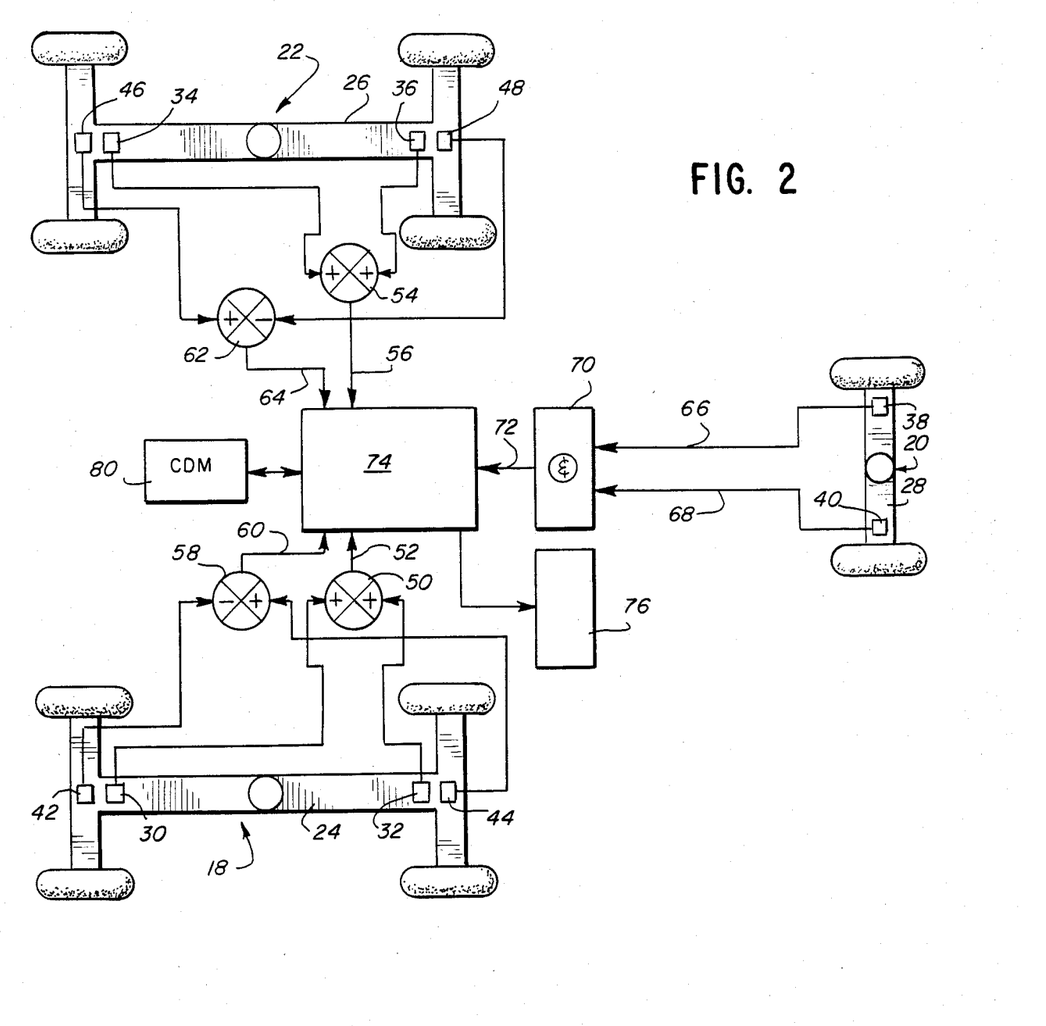
FIG. 2 is a diagramatic plan view of the aircraft landing gear in conjunction with a block diagram showing the sensor locations and computer interface for the weight and balance system of the present invention.

The weight and balance system, shown in FIG. 2, determines the weight of the aircraft 10 by measuring the weight on each of the main landing gears 18 and 22 and the weight on the nose gear 20. The weight on each of the landing gears is determined by sensing the amount of deflection or bend in the bogie beams 24 and 26 of the respective main landing gears 18 and 22 and in the axle 28 of the nose gear 20, the angle of bending being proportional to the weight or force on each of the members as disclosed in U.S. Pat. No. 4,312,042 and incorporated herein by reference.

The angle of bending is measured by a pair of inclinometers mounted on adjacent opposite ends of each of the landing gear members such as the inclinometers 30 and 32 for the bogie beam 24 of the main landing gear 18, the inclinometers 34 and 36 for the bogie beam 26 of the main landing gear 22 and the inclinometers 38 and 40 for the nose gear axle 28. The inclinometers 30–40 may be servoed accelerometers as disclosed in U.S. Pat. No. 3,702,073, the disclosure of which being incorporated herein by reference, with each accelerometer having its sensitive axis aligned with the axis of the bogie beam or axle with no load being applied thereto. Each of the inclinometers or servoed-accelerometers provides an indication of the actual angle of the beam or axle relative to a plane which is perpendicular to the force of gravity.

The outputs of the inclinometers 30 and 32 represent the respective angles $\theta_1$ and $\theta_2$, measured with respect to an inertial reference, the angles being defined as follows:

$$\theta_1 = \theta_B + \theta_{L1} + \theta_{A1} \quad (1)$$

$$\theta_2 = -\theta_B + \theta_{L2} + \theta_{A2} \quad (2)$$

where $\theta_B$ is the angle of the beam or axle caused by the airport ramp or runway tilt; $\theta_{L1}$ and $\theta_{L2}$ are the beam bend angles caused by a load; and $\theta_{A1}$ and $\theta_{A2}$ are the sensor axis misalignment and bias terms. The weight on a given landing gear member, bogie beams 24, 26 or nose gear axle 28 is given by the following equation:

$$W_T = K(\theta_{L1} + \theta_{L2}) \quad (3)$$

Where K is a scale factor which is dependent upon the beam or axle geometry and strength.

From the equations 1, 2 and 3, it is seen that by summing the output signals from each of the inclinometers such as 30 and 32 representing the angles $\theta_1$ and $\theta_2$, a signal is provided which is proportional to the weight on the beam 24, independent of the airport ramp angle or runway tilt angle, $\theta_B$. Similarly, by subtracting the output signals of the inclinometers, a signal is provided which is proportional to the acceleration of the member, independent of the weight applied thereto.

Each of the main landing gear members 18 and 22 are provided with two pairs of inclinometers, the pairs 30, 32 and 42, 44 for the bogie beam 24 and the pairs 34, 36 and 46, 48 for the bogie beam 26. The output signals of the inclinometers 30 and 32, are summed by a voltage summing circuit 50, the output of which on line 52 is proportional to the weight on the bogie beam 24. Similarly, the output signals of the inclinometers 34 and 36 are summed by a voltage summing circuit 54, the output of which on line 56 is proportional to the weight applied to the bogie beam 26. The output signals of the inclinometers 42 and 44 are applied to a differencing circuit 58, the output of which on line 60 is proportional to acceleration independent of weight. Similarly, the outputs of the inclinometers 46 and 48 are applied to a differencing circuit 62, the output of which on line 64 is proportional to acceleration independent of weight. The inclinometers 38 and 40 associated with the nose gear axle 28 have their respective signal outputs on lines 66 and 68 applied to a means 70 which performs a summing operation, the signal output on a line 72 representing the weight on the nose gear axle.

The weight signals generated on lines 52, 56 and 72 and the acceleration signals on lines 60 and 64 are applied to a computer 74 which may be a digital computer or an analog computer. The computer 74 calculates the weight on each of the landing gears according to equation 3 above and from those weights the computer calculates the total weight of the aircraft, the calculated aircraft weight being displayed on a pilot display unit 76. The center of gravity may also be determined directly from the geometry of the aircraft and the weight on each of the landing gears using well-known formulas, the calculated center of gravity also being displayed on the pilot display unit 76. The computer 74 interacts with a Calibration Data Module (CDM) 80 which is a non-volatile memory for retaining key weight data in the event that power to the aircraft is removed.

Figure 3A:
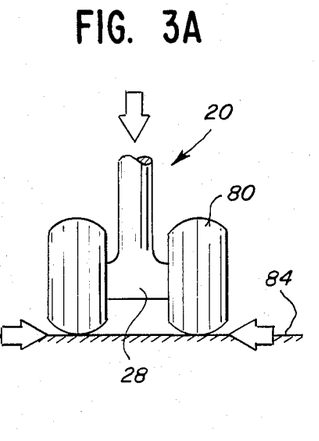
FIG. 3A is a front elevational view of a nose gear.
Figure 3B:
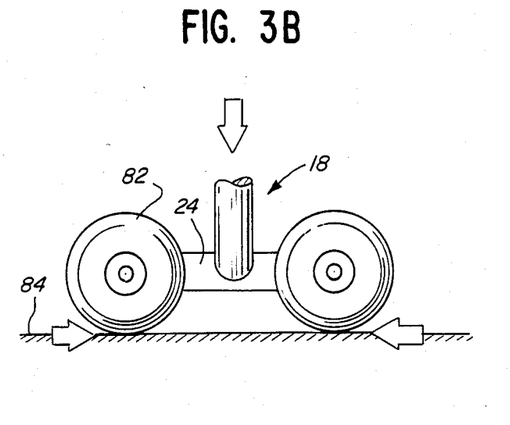
FIG. 3B is a side elevational view of a main landing gear.

The forces acting on the nose gear 20 and the main landing gears, such as the gear 18, are illustrated in FIGS. 3A and 3B respectively for a stationary aircraft. When the bogie beam 24 or the axle 28 is loaded and unloaded with weight, the resultant bending of the beam or axle creates a force tending to move the tires 80, 82 on the runway or ramp surface 84. This force, however, is opposed by frictional static forces between the tires and the ramp, creating counter-moments in the bogie beam and axle which constrain the bending of these members, the loading effects for the nose gear 20, where the axle is at right angles to the track of the tires being larger than the effects for the bogie beam 18 where the track of the tires and the beam are in the same axis. Because the weight and balance system calculates the aircraft weight from the angle of bending of these structural members, a loading error, if uncompensated for, is introduced into the calculated weight, due to the constrained bending of the beams and axle when the aircraft is stationary.

Once the aircraft is moved a short distance, such as one meter, the moments, constraining the bend of the main gears bogie beam and the nose gear axle, are eliminated so that the bogie beams and the axle deflect or bend to their true unconstrained value resulting in an accurate weight determination. Because it is impractical to move the aircraft after it is loaded in order to determine whether its weight and center of gravity are within safe operating limits, the weight and balance system of FIG. 2 is provided with a loading error correction system, illustrated in FIG. 5, which automatically compensates for the loading effects. Although the correction system is shown for the weight and balance system of FIG. 2 using inclinometers, the correction system of FIG. 5 may be used with any system providing a signal representative of the aircraft weight on a landing gear such as provided by strain gage sensors, pressure and magnetic variable reluctance sensors or the like.

Figure 4:
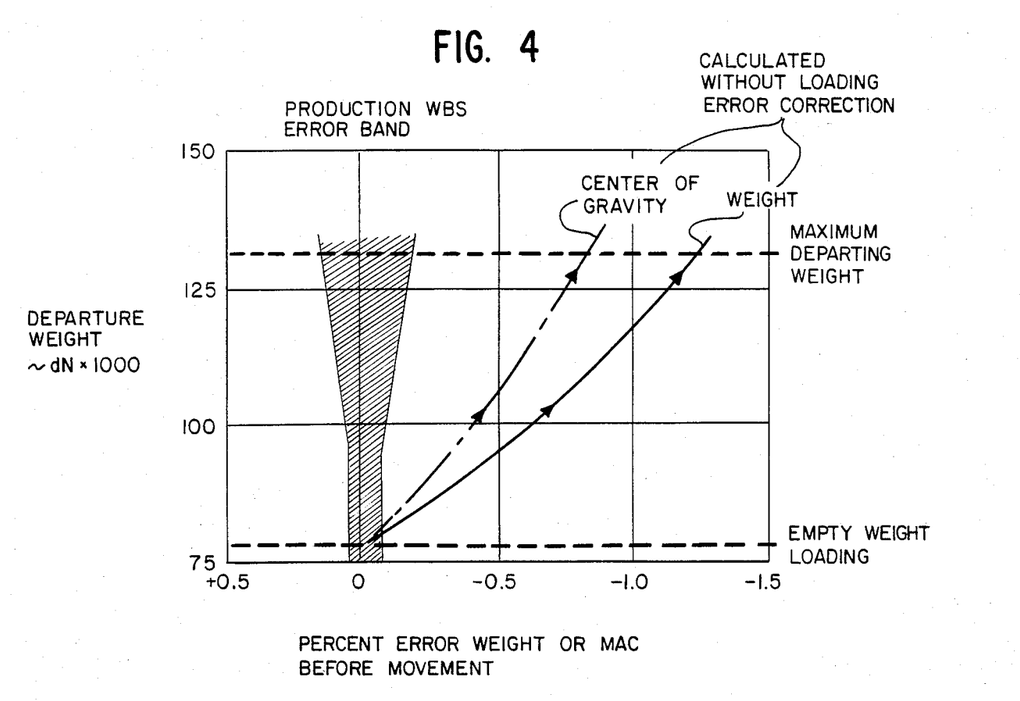
FIG. 4 is a graph illustrating the worst case loading errors for a weight and balance system utilizing the present invention and for a system where the loading errors are left uncorrected.

FIG. 4 illustrates the worst case loading errors in the calculated weight and center of gravity, the worst case occurring when the aircraft is loaded from its empty weight to its maximum departure weight. From the graph it is seen that the error band of the weight and balance system, with the automatic loading error correction system shown in FIG. 5, is much less than the percent error in the calculated weight and center of gravity where the loading errors are left uncorrected.

Figure 5:
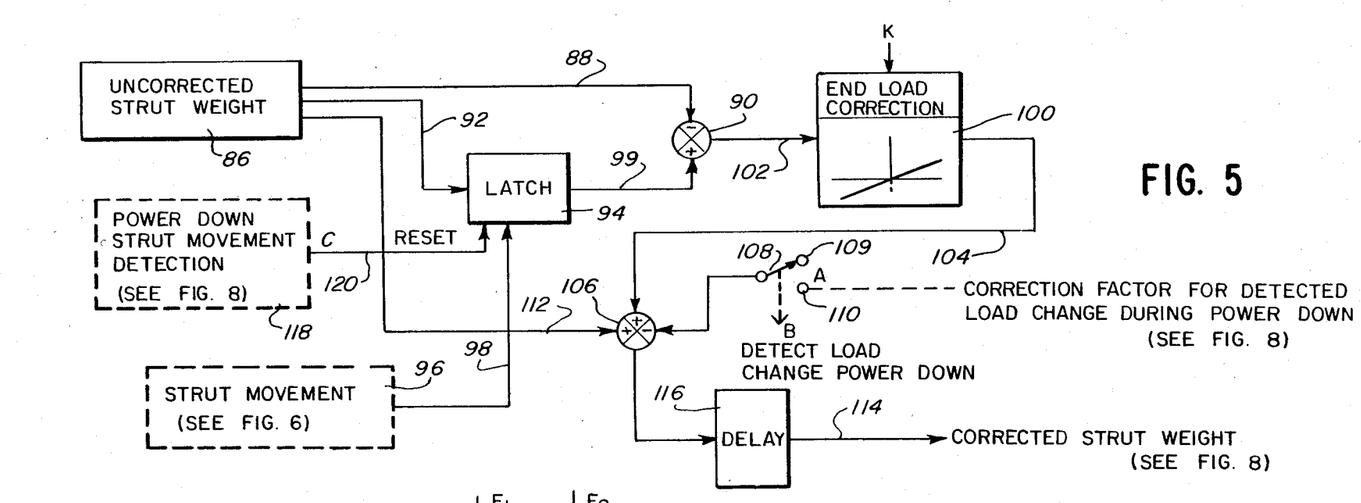
FIG. 5 is a block diagram of the system of the present invention for correcting loading errors.

The automatic loading error correction system is shown in FIG. 5 for either of the main landing gears 18 or 22 or the nose gear 20 where the strut weight 86 is continuously sensed from the outputs of the summing circuits 50, 54 or 70 on lines 52, 56 or 72. The sensed uncorrected strut weight 86 for a landing gear member is applied on a line 88 to a differencing circuit 90 performing a subtraction operation, and on a line 92 to a latch 94. When the aircraft is moving as determined by a strut movement detector 96 described in detail below, the detector applies a high signal on a line 98 to the latch 94 so that the uncorrected weight signal on line 92 is passed through the latch to the circuit 90 on a line 99. When the aircraft is moving, the uncorrected weight on line 99 is thus equal to the uncorrected strut weight on line 88 so that the output of the circuit 90 is zero. However, when the output of the movement detector 96 goes low indicating that the aircraft has stopped moving, the latch 94 holds the uncorrected strut weight applied thereto just after no movement is detected, the held weight also being stored in the CDM non-volatile memory 80. During the remainder of the time the aircraft is stationary the signal applied on line 98 to the circuit 90 is the uncorrected weight signal generated just after aircraft movement has ceased. This held weight signal is combined by circuit 90 with the weight signal applied on line 88, which signal varies as the aircraft is unloaded and reloaded.

The signal output from the circuit 90 represents the difference between the uncorrected weight signal generated just after no movement has been detected and the subsequently generated uncorrected weight signal. A multiplier 100 multiplies the difference signal applied thereto on line 102 by a loading error correction coefficient, K, which is dependent on the structure of the bogie beam or nose gear axle being monitored. For the nose gear, K is set equal to 0.05 and for each of the main gears, K is set equal to 0.025. The loading error compensation signal output from the multiplier 100 on a line 104 is applied to a summing circuit 106, which combines the uncorrected weight signal 86 applied on a line 112 with the loading error compensation signal from line 104 to generate a corrected weight signal on a line 114, the corrected weight signal being stored in the CDM non-volatile memory 80.

In order to compensate for fluctuations in the sensed uncorrected weight signal 86 caused by the passengers rushing towards the nose of the aircraft in order to exit after the aircraft has stopped, the generation of the corrected weight signal on line 114 is delayed by a 4-second delay 116 connected to the output of the summing circuit 106. The 4-second delay compensates for changes in the weight distribution before the corrected weight signal is stored in the non-volatile memory 80.

In the event that power has been removed from the system, once the power is restored, reasonableness tests are performed to determine whether the aircraft has been moved or whether there has been a load change during the power down. If aircraft or strut movement is detected, a power down strut movement detector 118 outputs a reset signal on a line 120 to the latch 94, the contents of which are reset to the uncorrected weight 86 applied on line 92 after power is restored. If a load change occurring during the power down is detected after power is restored, a switch 108 is moved from an open circuit terminal 109 to contact a terminal 110 to which is applied a power down correction factor. The power down correction factor is applied to the summing circuit 106 where it is combined with the error compensation signal on line 104 and the uncorrected weight signal on line 112 to compensate for the larger loading error which would otherwise result. The power down reasonableness tests are discussed in detail below with reference to FIG. 8.

Figure 6:
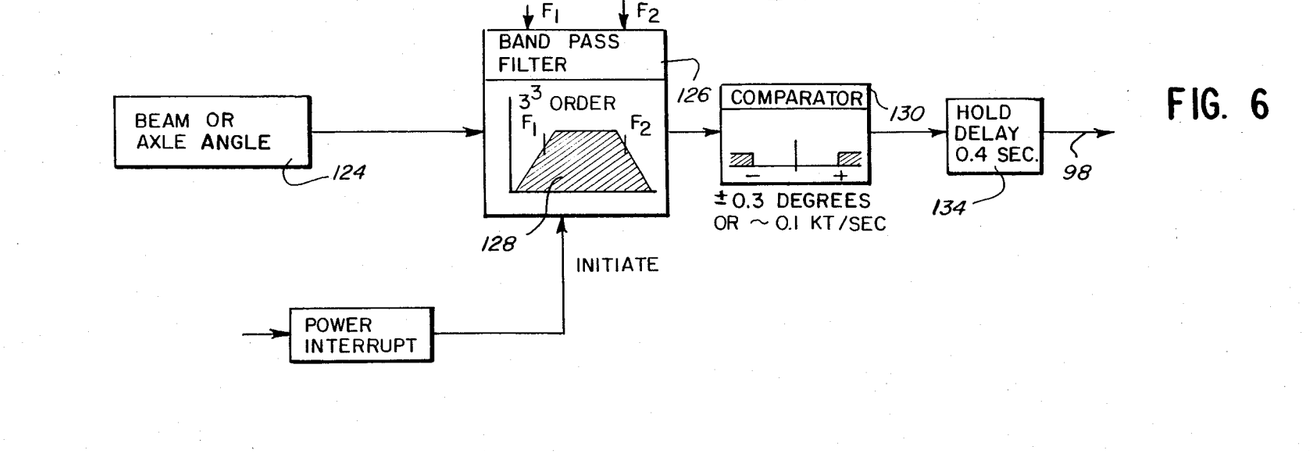
FIG. 6 is a block diagram of the system for detecting movement of a landing gear member.
Figure 7:
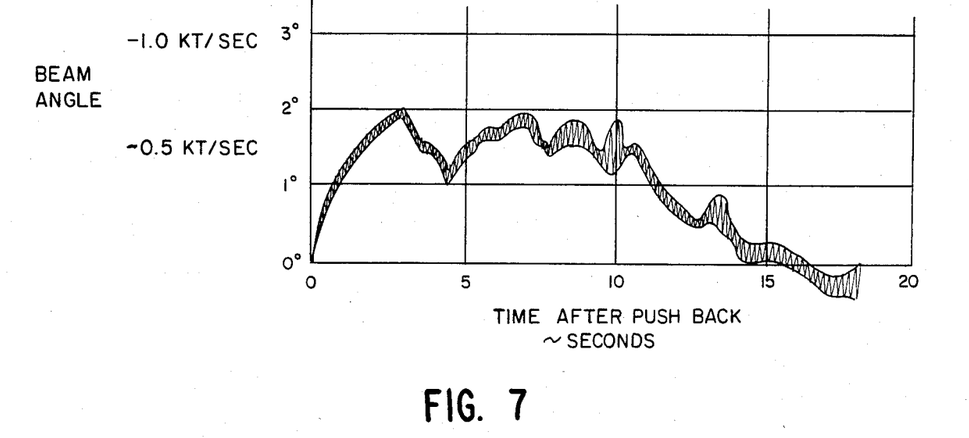
FIG. 7 is a graph illustrating a typical signature output signal of an accelerometer mounted on a bogie beam of a main landing gear.

The strut movement detector 96, as illustrated in FIGS. 5 and 6, provides a high output on line 98 to the latch 94 when the aircraft is moving and provides a low output to the latch when no movement is detected. The beam or axle angle signal 124 provided by the outputs of the differencing circuits 58 and 62 on respective lines 60 and 64, is proportional to the acceleration of the aircraft. A typical beam angle signal output from the differing circuits 58, 62 is illustrated in FIG. 7 bearing the unique signature of its associated landing gear member when moved. The beam angle signal 124 representing acceleration is applied to a third order band pass filter 126 which acts as a pseudo double integrator, the output of which represents strut movement in distance. The particular frequency components of interest associated with aircraft movement are typically different for the nose gear axle 28 and the bogie beams 24 and 26. As such, the limit frequencies $F_1$ and $F_2$ for the band pass filter 126, which isolates the particular frequency components of interest, are stored in the CDM non-volatile memory 80 for each of the landing gear members. For the nose gear axle, $F_1$ and $F_2$ are set equal to 0.1 hz and 5.0 hz respectively and for the bogie beams $F_1$ and $F_2$ are set equal to 0.05 hz and 20 hz respectively.

If the beam or axle angle signal 124 falls within the shaded area 128 of the filter indicating movement, a high signal is output from the filter 126 and applied to a comparator 130, a zero output being produced by the filter if the angle signal is outside of the shaded area. The comparator 130 compares the signal output from the band pass filter 126 to a $\pm 0.3$ reference signal supplied by the CDM non-volatile memory 80. If the amplitude of the filter output signal is greater than $+0.3$ or less than $-0.3$, the comparator produces a high output on the line 98 indicating aircraft movement. When the filter output signal is within 0.3 of zero, indicating the aircraft has come to a stop, the output of the comparator 130 goes low causing the latch 94 to hold the uncorrected weight signal generated at that time.

The output of the comparator 130 is applied to a 0.4 second hold delay 134 to eliminate short term vibrations in the output signal which are not indicative of movement. The delay 134 prevents the generation of a high output signal on line 98 until a period of 0.4 seconds has elapsed from the time that the comparator 130 has generated a high output signal, the delay circuit 134 providing an immediate indication, i.e., with no delay, when the output of the comparator drops to a low state indicating that movement of the aircraft has ceased.

It is noted that the output of the strut detection circuit is also applied to the pilot's display unit 76. A high output, indicating movement, causes the aircraft weight and center of gravity indication on the display 76 to freeze since movement eliminates the loading errors in the calculated weights and center of gravity. However, when zero movement is detected, the output of the comparator 130 going low, the output signal unfreezes the display 76 to show the corrected and updated weight and center of gravity as calculated by the system of FIG. 5.

Figure 8:
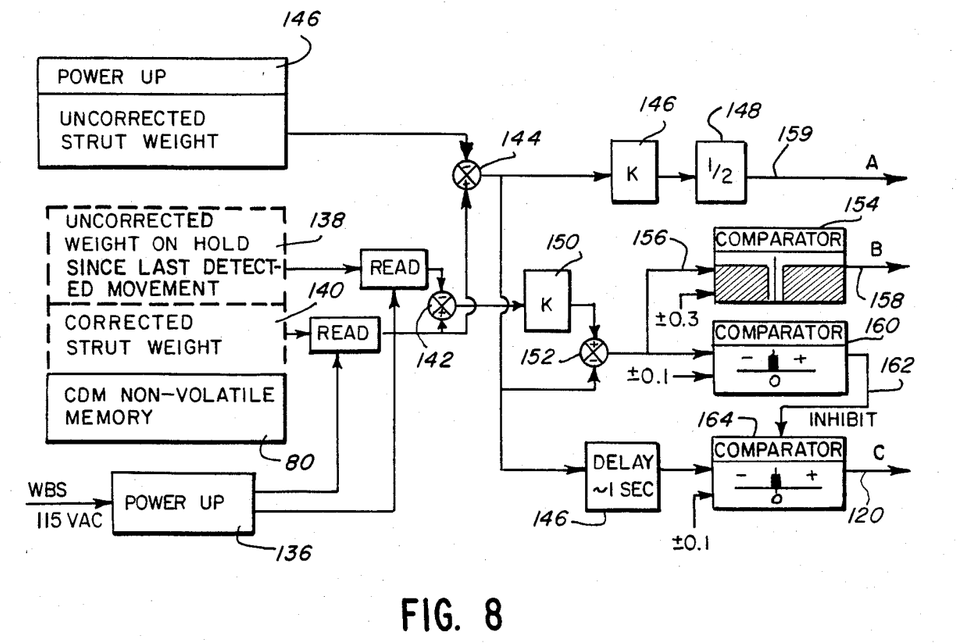
FIG. 8 is a block diagram of the system for performing reasonableness tests in the event that power to the system has been removed.

The system for performing reasonableness tests in the event that power to the system has been lost is shown in FIG. 8. In response to a power up signal 136 generated when power to the system is restored after having been lost, the uncorrected strut weight on hold since the last detected movement 138 and the corrected strut weight 140 generated prior to the power down, both of which are stored in the CDM non-volatile memory 80, are read and applied to a differencing circuit 142. The output of the differencing circuit 142 represents the corrected strut weight 140 minus the uncorrected held strut weight 138. The stored corrected strut weight 140 is also applied to a differencing circuit 144, to the negative terminal of which is applied the power up uncorrected strut weight 146 generated upon the restoration of power. The output of the differencing circuit 144 is applied to a multiplier 146 which multiplies the signal representing the difference between the stored corrected strut weight 140 and the power up uncorrected strut weight 146, by the loading error correction coefficient K, where K is equal to 0.025 for the main landing gears and 0.05 for the nose gear. The output of the multiplier 146 is applied to a second multiplier 148 which multiplies the input thereof by one-half to provide the power down correction factor on a line 159 to terminal 110, the correction factor being equal to K/2 multiplied by the difference between the stored corrected strut weight 140 and the power up uncorrected strut weight 146.

In order to determine whether a load change had occurred during the power down, the output of the differencing circuit 142, representing the difference between the stored corrected strut weight 140 and the held uncorrected strut weight 138, is applied to a multiplier 150 which multiplies the output of the circuit by the loading error correction coefficient K for the particular landing gear being monitored. A differencing circuit 152 combines the output from the multiplier 150 with the output of the differencing circuit 144 to provide a signal representative of the difference therebetween. The output of the differencing circuit 152 is applied on a line 156 to a comparator 154 for comparison to a reference signal of ±0.3. If the signal on line 156 is greater than 0.3 or less than −0.3, the output of the comparator 154 goes high, indicating that a load change occurring during power down has been detected.

The output of the comparator on line 158, when high, is used to actuate a relay or the like to cause the switch 108 of FIG. 5 to contact the terminal 110. The power down load correction factor from line 159 is then applied throu9h the switch 108 to the summing circuit 106 where it is combined with the error compensation signal applied on line 104 and the uncorrected strut weight signal applied on line 112 to provide the corrected strut weight signal.

In order to detect whether aircraft movement or strut movement had occurred during the power down, the output from the differencing circuit 152 is applied to a zero comparator 160, the other input of which is ±0.1. If the output from the differencing circuit 152 is within 0.1 of zero, the output of the comparator 160 generates a high inhibit signal indicating no movement during the power down, the inhibit signal being applied on a line 162 to a comparator 164. A high inhibit signal indicating no movement prevents the comparator 164 from going high regardless of the inputs applied thereto.

The output from the differencing circuit 144 representing the difference between the corrected strut weight 140 and the power up uncorrected strut weight 146 is applied to the comparator 164 through a one-second delay 166, a ±0.1 reference signal being applied to the other input of the comparator 164. If the difference between the corrected strut weight 140 and the power up uncorrected strut weight 146 is within 0.1 of zero and there is no inhibit signal on line 162, the output of the comparator 164 goes high, producing the reset signal on line 120 of FIG. 5 to reset the latch 94 to hold the uncorrected strut weight 86 which is the power up uncorrected strut weight 146. If the output of the differencing circuit 144 is not within 0.1 of zero, the output of the comparator 164 is low, indicating no detected strut movement. If the output from the differencing circuit 144 is within 0.1 of zero but a high inhibit signal is applied on line 162 to the comparator 164, the output of the comparator remains low. The one-second delay of the output from the differencing circuit 144 prevents the output of the comparator 164 from going high when a determination of no movement is made by the comparator 160 generating a high inhibit signal on line 162.

It is noted that the system of FIG. 8 performs reasonableness tests; that is, load changes and gear movement occurring during power down may not always result in high outputs on lines 120 and 158. If the system of FIG. 8 determines that the load changes or gear movements occurring during power down are within limits so that weight signal held prior to power down and the error compensation signal on line 104 will adequately compensate for the errors, the outputs on lines 120 and 158 will be low.

I claim:

1. In a weight measuring system for an aircraft having a landing gear and means for generating a weight signal representing aircraft weight on the landing gear, a system for correcting loading errors in the generated weight signal comprising:
   means for holding a weight signal upon the occurrence of an aircraft condition;
   means for generating an error compensation signal from said held weight signal and a weight signal generated subsequent thereto; and
   means for combining the subsequently generated weight signal and the error compensation signal to generate a corrected weight signal.

2. The system of claim 1 wherein said error compensation signal generating means includes means for combining the held weight signal and the subsequently generated weight signal to provide a signal representative of the difference therebetween; and means for multiplying said difference signal by an error correction coefficient to provide the error compensation signal.

3. The system of claim 2 wherein the error correction coefficient corresponds to the particular landing gear member, the weight on which is being determined.

4. The system of claim 2 wherein the landing gear member is a nose gear axle and the error correction coefficient is approximately 0.050.

5. The system of claim 2 wherein the landing gear member is a beam of a main landing gear and the error correction coefficient is approximately 0.025.

6. The system of claim 1 wherein said held weight signal is the weight signal generated immediately after the aircraft stops moving and said subsequent weight signal is a weight signal generated prior to subsequent movement of the aircraft.

7. The system of claim 1 further including means responsive to the restoration of power to the system after power has been down, for determining whether the landing gear had been moved during the power down.

8. The system of claim 7 further including means responsive to the movement determining means for resetting the holding means to hold the weight signal generated immediately after power is restored.

9. The system of claim 1 further including:
means responsive to the restoration of power to the system after power has been down for determining whether the aircraft weight on the landing gear had changed during the power down.

10. The system of claim 9 further including:
means for generating a power down correction signal, the correction signal to be combined by the combining means with the subsequently generated weight signal and the error compensation signal in response to a determination that the aircraft weight on the landing gear had changed during the power down.

11. The system of claim 1 further including a non-volatile memory for storing the held weight signal and the corrected weight signal.

12. The system of claim 1 further including means for delaying the generation of the corrected weight signal to compensate for fluctuations in the distribution of weight on the landing gear.

13. In a weight measuring system for an aircraft having a landing gear and means for generating a weight signal representing aircraft weight on the landing gear, a system for correcting loading errors in the generated weight signal comprising:
means for detecting movement of the landing gear;
means responsive to the movement detecting means for holding a first weight signal generated immediately before the last detected movement;
means for generating an error compensation signal in response to said held weight signal and a second weight signal generated prior to the next detected movement; and
means for combining the error compensation signal with the second weight signal to provide a corrected weight signal.

14. The system of claim 13 wherein the movement detecting means includes means for generating a signal representing the acceleration of the landing gear.

15. The system of claim 14 further including a double integrator means responsive to the acceleration signal for providing a signal representing movement of the landing gear in distance.

16. The system of claim 15 further including means for comparing the distance signal to a reference signal to determine movement of the landing gear member.

17. The system of claim 14 further including means for filtering the acceleration signal to isolate the particular frequency components of interest.

18. The system of claim 17 wherein the filter means is a third order band pass filter, the frequency limits of which correspond to the particular landing gear member, the movement of which is being detected.

19. The system of claim 17 further including means for comparing the filtered signal to a reference signal to detect movement of the landing gear and for providing signals indicative of detected movement and of no detected movement.

20. The system of claim 19 further including means for delaying only the signal indicative of movement.

21. In a weight measuring system for an aircraft having a landing gear member and means for generating a weight signal representing aircraft weight on the landing gear, a system for correcting loading errors in the generated weight signal comprising:
means for sensing nonmovement of the aircraft;
means for holding a weight signal immediately prior to sensing of nonmovement of the aircraft;
means for generating an error compensation signal in response to said held weight signal and a subsequently generated weight signal;
means for combining the subsequently generated weight signal and the error compensation signal to generate a corrected weight signal;
a non-volatile memory for storing the held weight signal and the corrected weight signal in the event that power to the system is removed; and
means responsive to the restoration of power to the system after power has been removed and to the stored held weight signal, the stored corrected weight signal and a power up weight signal generated just after power is restored for determining whether the landing gear had moved or whether the aircraft weight on the landing gear had changed during the time power was removed.

22. The system of claim 21 further including means for generating a power down error correction signal in response to said stored corrected weight signal and said power up weight signal, said power down error correction signal being combined by said combining means with the subsequently generated weight signal and the error compensation signal to provide the corrected weight signal when the aircraft weight on the landing gear has been determined to have changed during the time power was removed.

23. The system of claim 22 wherein said means for generating the power down error correction signal includes
means for combining the stored corrected weight signal and the power up weight signal to provide a signal representing the difference therebetween; and means for scaling the difference signal by an error correction coefficient to provide the power down error correction signal.

24. The system of claim 21 further including means for resetting the holding means to hold the power up weight signal when the landing gear has been determined to have moved during the time power was removed.

25. The system of claim 21 wherein the determining means includes:
means for combining the stored corrected weight signal and the power up weight signal to provide a first signal representative of the difference therebetween;
means for combining the stored corrected weight signal and the stored held weight signal to provide a second signal representative of the difference therebetween;

means for scaling the second difference signal by a constant; and means for combining the first difference signal with the scaled difference signal to provide a third difference signal representative of the difference therebetween.

26. The system of claim 25 further including means for comparing the third difference signal to a reference signal to provide a signal indicative of a load change during the time power was removed if the third difference signal is greater than the reference signal.

27. The system of claim 25 further including means for comparing the third difference signal to a reference signal to provide a signal indicative of no movement of the landing gear if the third difference signal is approximately zero.

28. The system of claim 25 further including first means for comparing the first difference signal to a reference signal to provide a signal indicative of movement of the landing gear if the first difference signal is approximately zero.

29. The system of claim 28 further including before it is applied to the first comparing means, and second means for comparing the third difference signal to a reference signal to provide an inhibit signal to the first comparing means if the third difference signal is approximately zero.

30. A weight measuring system for aircraft having landing gear comprising:

means responsive to mechanical characteristics of a structural member of the landing gear functionally related to aircraft weight for generating a weight signal;

means for generating an error signal representing the effects on the structural member caused by loading of the aircraft as the aircraft is stationary; and means for combining said weight signal and said error signal to generate a corrected weight signal.

* * * * *